United States Patent
Nam et al.

(10) Patent No.: US 12,404,424 B2
(45) Date of Patent: *Sep. 2, 2025

(54) SILICONE-BASED ADHESIVE PROTECTION FILM AND OPTICAL MEMBER COMPRISING SAME

(71) Applicant: SAMSUNG SDI CO., LTD., Yongin-si (KR)

(72) Inventors: Irina Nam, Suwon-si (KR); Dong Il Han, Suwon-si (KR); Won Kim, Suwon-si (KR); Young Hoon Kim, Suwon-si (KR); Il Jin Kim, Suwon-si (KR); Hyun Seung Kim, Suwon-si (KR); Tae Ji Kim, Suwon-si (KR); Bong Soo Park, Suwon-si (KR); Yoo Jin Suh, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 727 days.

This patent is subject to a terminal disclaimer.

(21) Appl. No.: 17/594,581

(22) PCT Filed: Apr. 24, 2020

(86) PCT No.: PCT/KR2020/005445
§ 371 (c)(1),
(2) Date: Oct. 22, 2021

(87) PCT Pub. No.: WO2020/218879
PCT Pub. Date: Oct. 29, 2020

(65) Prior Publication Data
US 2022/0220344 A1    Jul. 14, 2022

(30) Foreign Application Priority Data

Apr. 25, 2019  (KR) .................. 10-2019-0048753
Apr. 29, 2019  (KR) .................. 10-2019-0049625

(51) Int. Cl.
| | | |
|---|---|---|
| *C09J 7/10* | (2018.01) | |
| *C09J 7/30* | (2018.01) | |
| *C09J 7/38* | (2018.01) | |
| *C09J 183/04* | (2006.01) | |
| *G02B 1/14* | (2015.01) | |

(52) U.S. Cl.
CPC . *C09J 7/10* (2018.01); *C09J 7/30* (2018.01); *C09J 7/38* (2018.01); *C09J 183/04* (2013.01); *G02B 1/14* (2015.01); *C09J 2203/318* (2013.01); *C09J 2483/00* (2013.01)

(58) Field of Classification Search
CPC ......... C09J 7/10; C09J 7/38; C09J 7/30; C09J 183/04; C09J 2483/00; C09J 2203/318; G02B 1/14

See application file for complete search history.

(56) References Cited

U.S. PATENT DOCUMENTS

| | | |
|---|---|---|
| 6,013,201 A | 1/2000 | Hayashida et al. |
| 2005/0020764 A1 | 1/2005 | Dhaler et al. |
| 2006/0094834 A1 | 5/2006 | Aoki et al. |
| 2007/0090299 A1 | 4/2007 | Kozakai et al. |
| 2011/0097579 A1 | 4/2011 | Mizuno et al. |
| 2011/0111217 A1 | 5/2011 | Kuroda et al. |
| 2012/0045635 A1 | 2/2012 | Aoki |
| 2013/0224416 A1 | 8/2013 | Cho et al. |
| 2015/0152295 A1 | 6/2015 | Nagashima |
| 2018/0118988 A1 | 5/2018 | Kuroda |
| 2020/0208032 A1 | 7/2020 | Han et al. |

FOREIGN PATENT DOCUMENTS

| | | |
|---|---|---|
| CN | 101784631 A | 7/2010 |
| CN | 102224188 A | 10/2011 |
| CN | 102753641 A | 10/2012 |
| CN | 103210052 A | 7/2013 |
| CN | 104685013 A | 6/2015 |
| CN | 105899616 A | 8/2016 |
| CN | 111378188 A | 7/2020 |
| JP | H05-98239 A | 4/1993 |
| JP | 11-181286 A | 7/1999 |
| JP | 2010-143976 A | 7/2010 |

(Continued)

OTHER PUBLICATIONS

Japanese Office Action dated Sep. 19, 2023 issued in Japanese Patent Application No. 2021-563078 (25 pages).
International Search Report of PCT/KR2020/005445, Aug. 7, 2020, 4 pages.
Chinese Office Action dated Oct. 11, 2022 issued in Chinese Patent Application No. 202080030673.5 (7 pages).
International Search Report for corresponding Application No. PCT/KR2020/005285 dated Jul. 29, 2020, 4pp.
Korean Office Action from corresponding Korean Patent Application No. 10-2019-0046923, Korean Office Action issued Oct. 19, 2021 (5 pgs.).
Chinese Office action dated Jun. 28, 2022 issued in corresponding CN Application No. 202080030487.1, 6 pages.

(Continued)

*Primary Examiner* — Patrick D Niland
(74) *Attorney, Agent, or Firm* — Womble Bond Dickinson (US) LLP

(57) ABSTRACT

Provided are a silicone-based adhesive protection film and an optical member comprising same, the silicone-based adhesive protection film being formed of a composition comprising an alkenyl group-bearing organic polysiloxane mixture, an organic polysiloxane resin, a crosslinker, and a hydrosylication catalyst, wherein the alkenyl group-bearing organic polysiloxane mixture comprises component (i) and component (ii), and the organic polysiloxane resin comprises at least one of organic polysiloxane resins, each bearing a $R^1R^2R^3SiO_{1/2}$ unit ($R^1$, $R^2$, and $R^3$ are each independently an alkyl group of 1 to 6 carbon atoms or an alkenyl group of 2 to 10 carbon atoms) and a $SiO_{4/2}$ unit.

21 Claims, 1 Drawing Sheet

(56) References Cited

FOREIGN PATENT DOCUMENTS

| | | | |
|---|---|---|---|
| JP | 2011-102336 A | 5/2011 | |
| JP | 2012-041505 A | 3/2012 | |
| JP | 2013-107884 A | 6/2013 | |
| JP | 2015-151418 A | 8/2015 | |
| JP | 2018-513881 A | 5/2018 | |
| JP | 2018-522969 A | 8/2018 | |
| JP | 2021-500417 A | 1/2021 | |
| KR | 10-2007-0043629 A | 4/2007 | |
| KR | 10-2007-0080970 A | 8/2007 | |
| KR | 10-2010-0066520 A | 6/2010 | |
| KR | 10-2011-0052483 A | 5/2011 | |
| KR | 10-2012-0050136 A | 5/2012 | |
| KR | 10-2014-0047571 A | 4/2014 | |
| KR | 10-2016-0085864 A | 7/2016 | |
| KR | 10-1695316 B1 | 1/2017 | |
| TW | 200728427 A | 8/2007 | |
| WO | WO-2015068859 A1 * | 5/2015 | ................ C08J 5/18 |
| WO | WO 2015/163040 A1 | 10/2015 | |
| WO | WO 2016/139956 A1 | 9/2016 | |
| WO | WO 2018/056167 A1 | 3/2018 | |
| WO | WO 2018/079678 A1 | 5/2018 | |
| WO | WO 2018/096858 A1 | 5/2018 | |
| WO | WO 2018/193973 A1 | 10/2018 | |
| WO | WO 2019/009175 A1 | 1/2019 | |
| WO | WO 2019/159611 A1 | 8/2019 | |
| WO | WO 2020/121930 A1 | 6/2020 | |

OTHER PUBLICATIONS

Japanese Office Action dated Sep. 12, 2023, issued in corresponding Japanese Patent Application No. 2021-562822 (3 pages).
US Restriction Requirement dated Jun. 21, 2024, issued in U.S. Appl. No. 17/594,562 (9 pages).
Final Rejection for U.S. Appl. No. 17/594,562 dated Feb. 11, 2025, 12 pages.
Machine translation of WO-2018/096858-A1 accessed Oct. 22, 2024, 18 pages.
Office Action for U.S. Appl. No. 17/594,562 dated Oct. 29, 2024, 13 pages.
Shin-Etsu Chemical Co., Ltd. "X-40-2450: Ionic liquid modified silicone oligomer," retrieved Oct. 22, 2024, 3 pages.

* cited by examiner

【Figure 1】
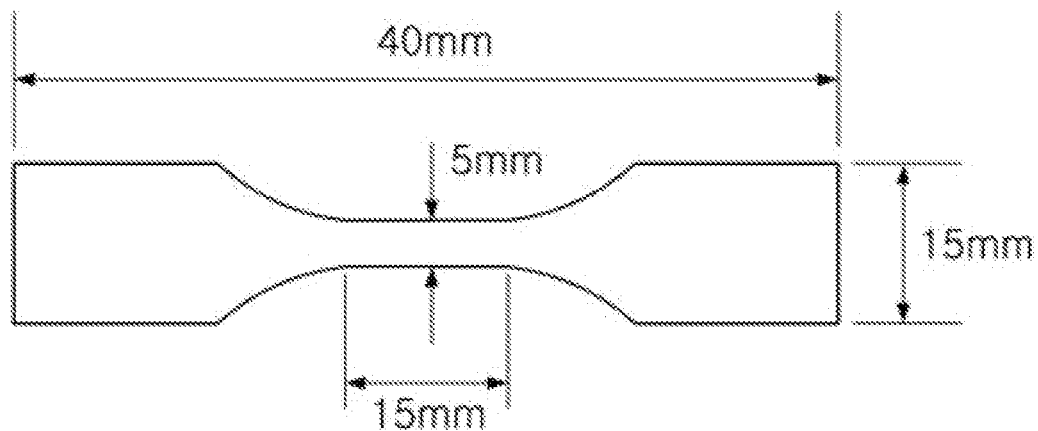
【Figure 2】
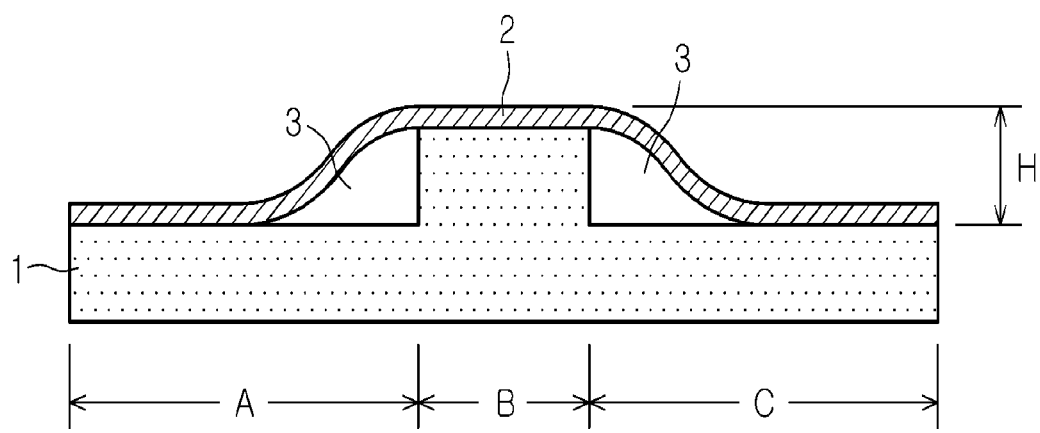

SILICONE-BASED ADHESIVE PROTECTION FILM AND OPTICAL MEMBER COMPRISING SAME

CROSS-REFERENCE TO RELATED APPLICATIONS

This application is a U.S. National Phase Patent Application of International Application Number PCT/KR2020/005445, filed on Apr. 24, 2020, which claims priority of Korean Patent Application Number 10-2019-0048753, filed on Apr. 25, 2019, and Korean Patent Application Number 10-2019-0049625, filed on Apr. 29, 2019, the entire contents of all of which are incorporated herein by reference.

TECHNICAL FIELD

The present invention relates to a silicone-based adhesive protective film and an optical member comprising the same.

BACKGROUND ART

The use, storage and manufacturing environments of optical displays are becoming harsh. In addition, interest in new optical displays, such as wearable devices, foldable devices, and the like, is also increasing. As a result, an adhesive protective film for protecting a panel of the optical display is required to have various properties. In particular, with the development of a panel having a compact structure and high flexibility, there is a need for development of an adhesive protective film that allows less damage to the panel and less change in properties thereof even under severe conditions upon removal of the adhesive protective film.

Accordingly, an acrylate or urethane acrylate-based adhesive protective film has been developed in the art. However, when the acrylate or urethane acrylate-based adhesive protective film attached to an adherend is left for a long period of time, peel strength of the adhesive protective film to the adherend increases excessively, thereby causing damage to and/or deformation of the adherend upon removal of the adhesive protective film therefrom while deteriorating processability due to difficulty in removal of the protective film.

The background technique of the present invention is disclosed in Korean Patent Laid-open Publication No. 2012-0050136 and the like.

DISCLOSURE

Technical Problem

It is one object of the present invention to provide a silicone-based adhesive protective film that provides good effects in protection of an adherend, a low peel strength increase rate, good wettability, and good step embedding properties.

It is another object of the present invention to provide a silicone-based adhesive protective film that can prevent contamination of and damage to an adherend upon removal of the silicone-based adhesive protective film from the adherend.

Technical Solution

One aspect of the present invention relates to a silicone-based adhesive protective film.

1. The silicone-based adhesive protective film is formed of a composition including an alkenyl group-containing organic polysiloxane mixture, an organic polysiloxane resin, a crosslinking agent, and a hydro-silylation catalyst, wherein the alkenyl group-containing organic polysiloxane mixture includes a mixture of a component (i) and a component (ii), Component (i): an organic polysiloxane having at least one silicon-bonded $C_3$ to $C_{10}$ alkenyl group, Component (ii): an organic polysiloxane having at least one silicon-bonded vinyl group; and the organic polysiloxane resin includes at least one of organic polysiloxane resins including an $R^aR^bR^cSiO_{1/2}$ unit ($R^a$, $R^b$ and $R^c$ being each independently a $C_1$ to $C_6$ alkyl group or a $C_2$ to $C_{10}$ alkenyl group) and a $SiO_{4/2}$ unit.

2. In 1, the silicone-based adhesive protective film may have a peel strength increase rate of 50% or less, as calculated by Equation 1:

Peel strength increase rate=$(P2-P1)/P1 \times 100$, [Equation 1]

where P1 denotes an initial peel strength (unit: gf/inch) of the silicone-based adhesive protective film with respect to an adherend in a specimen of the silicone-based adhesive protective film and the adherend; and P2 denotes a peel strength (unit: gf/inch) of the silicone-based adhesive protective film with respect to the adherend of the specimen, as measured after the specimen is left under conditions of 23° C. and 50% RH (relative humidity) for 14 days.

3. In 1 and 2, the silicone-based adhesive protective film may have a peel strength increase rate of 100% or less, as calculated by Equation 1-1:

Peel strength increase rate=$(P3-P1)/P1 \times 100$, [Equation 1-1]

where P1 denotes an initial peel strength (unit: gf/inch) of the silicone-based adhesive protective film with respect to an adherend in a specimen of the silicone-based adhesive protective film and the adherend; and P3 denotes a peel strength (unit: gf/inch) of the silicone-based adhesive protective film with respect to the adherend of the specimen, as measured after the specimen is left at 50° C. for 7 days.

4. In 1 to 3, the silicone-based adhesive protective film may have a residual peel strength variation rate of less than 20%, as calculated by Equation 2:

Residual peel strength variation rate=$(1-(M2/M1)) \times 100$, [Equation 2]

where M1 denotes a peel strength (unit: gf/inch) of an adhesive tape with respect to an adherend; and M2 denotes a peel strength (unit: gf/inch) of the adhesive tape with respect to the adherend upon removal of the adhesive film from the adherend of a specimen, as measured after the silicone-based adhesive protective film is removed from the specimen and the adhesive tape is attached to a surface of the specimen having the silicone-based adhesive protective film removed therefrom and is left under conditions of 23° C. and 50% RH (relative humidity) for 24 hours, in which the specimen is prepared by attaching a stack of the silicone-based adhesive protective film and a release film to the adherend via the silicone-based adhesive protective film and is left at 50° C. for 14 days.

5. In 1 to 4, the silicone-based adhesive protective film may have a residual peel strength reduction rate of −50% or more, as calculated by Equation 2-1:

Residual peel strength reduction rate=$(M3-M4)/M4 \times 100$, [Equation 2-1]

where M3 denotes a peel strength (unit: gf/inch) of an adhesive tape upon removal of the adhesive film from an adherend of a specimen, as measured after the silicone-based adhesive protective film is removed from the specimen and the adhesive tape is attached to a surface of the specimen having the silicone-based adhesive protective film removed therefrom and is left at 25° C. for 30 minutes, in which the specimen is prepared by attaching a stack of the silicone-based adhesive protective film and a release film to the adherend via the silicone-based adhesive protective film, left at 50° C. for 7 days, and cooled at 25° C. for 30 minutes; and M4 denotes a peel strength (unit: gf/25 mm) of the adhesive tape with respect to an initial adherend having no silicone-based adhesive protective film attached thereto.

6. In 1 to 5, the silicone-based adhesive protective film may have a peel strength of 3 gf/inch or less with respect to an adherend.

7. In 1 to 6, in the component (i), the $C_3$ to $C_{10}$ alkenyl group may be a hexenyl group.

8. In 7, the hexenyl group may be a 5-hexenyl group.

9. In 1 to 8, the component (i) may include an organic polysiloxane represented by Formula 1.

$$(R^1R^2SiO_{2/2})x(R^3R^4SiO_{2/2})y, \qquad \text{[Formula 1]}$$

in Formula 1, $R^1$ is a $C_3$ to $C_{10}$ alkenyl group; $R^2$ is a $C_1$ to $C_{10}$ alkyl group; $R^3$ and $R^4$ are each independently a $C_1$ to $C_{10}$ alkyl group; and $0<x\leq1$, $0\leq y<1$, and $x+y=1$.

10. In 9, in Formula 1, x and y may satisfy $0.001\leq x\leq0.4$ and $0.6\leq y\leq0.999$.

11. In 1 to 10, the component (ii) may include at least one of organic polysiloxanes represented by Formula 2, Formula 3 and Formula 4.

$$R^5R^6R^7SiO(R^1R^2SiO_{2/2})x(R^3R^4SiO_{2/2})ySiR^8R^9R^{10}, \qquad \text{[Formula 2]}$$

in Formula 2, $R^1$, $R^2$, $R^3$ and $R^4$ are each independently a $C_1$ to $C_{10}$ alkyl group; $R^5$, $R^6$ and $R^7$ are each independently a vinyl group or a $C_1$ to $C_{10}$ alkyl group, at least one of $R^5$, $R^6$ and $R^7$ being a vinyl group; $R^8$, $R^9$ and $R^{10}$ are each independently a vinyl group or a $C_1$ to $C_{10}$ alkyl group, at least one of $R^8$, $R^9$ and $R^{10}$ being a vinyl group; and $x+y=1$.

$$(R^1R^2SiO_{2/2})x(R^3R^4SiO_{2/2})y(R^5R^6SiO_{2/2})z, \qquad \text{[Formula 3]}$$

in Formula 3, $R^1$, $R^2$, $R^3$, $R^4$, $R^5$, $R^6$ are each independently a $C_1$ to $C_{10}$ alkyl group, a vinyl group, or a $C_6$ to $C_{10}$ aryl group, at least one of $R^1$ and $R^2$ being a vinyl group; and $0<x\leq1$, $0\leq y<1$, $0\leq z<1$, and $x+y+z=1$.

$$(R^1R^2SiO_{2/2})x(R^3R^4SiO_{2/2})y, \qquad \text{[Formula 4]}$$

in Formula 4, $R^1$, $R^2$, $R^3$ and $R^4$ are each independently a $C_1$ to $C_{10}$ alkyl group, a vinyl group or a $C_6$ to $C_{10}$ aryl group, at least one of $R^1$ and $R^2$ being a vinyl group; and $0<x\leq1$, $0\leq y<1$, and $x+y=1$.

12. In 11, the organic polysiloxane of Formula 2 may be a $Vi(CH_3)_2SiO$—$((CH_3)_2SiO_{2/2})n$—$Si(CH_3)_2Vi$ [Vi being a vinyl group, n being an integer of greater than 0 to 5,000].

13. In 11, in Formula 3, both $R^3$ and $R^4$ may be a $C_6$ to $C_{10}$ aryl group; both $R^5$ and $R^6$ may be a $C_1$ to $C_{10}$ alkyl group, and x, y and z satisfy relations: $0<x<1$, $0<y<1$, $0<z<1$, and $x+y+z=1$.

14. In 11, in Formula 4, both $R^3$ and $R^4$ may be a $C_1$ to $C_{10}$ alkyl group, and x, y and z satisfy relations: $0<x<1$, $0<y<1$, and $x+y=1$.

15. In 1 to 14, the component (i) may be present in an amount of 10 parts by weight to 70 parts by weight and the component (ii) may be present in an amount of 30 parts by weight to 90 parts by weight relative to 100 parts by weight of the alkenyl group-containing organic polysiloxane mixture.

16. In 1 to 15, in the organic polysiloxane resin, at least one of $R^a$, $R^b$ and $R^c$ of the organic polysiloxane resin may be a $C_2$ to $C_{10}$ alkenyl group.

17. In 1 to 16, in the organic polysiloxane resin, the $R^aR^bR^cSiO_{1/2}$ unit and the $SiO_{4/2}$ unit may be present in a mole ratio ($R^aR^bR^cSiO_{1/2}$ unit:$SiO_{4/2}$ unit) of 0.25:1 to 2.5:1 in the organic polysiloxane resin.

18. In 1 to 17, the organic polysiloxane resin may include a mixture of a component (iii) and a component (iv):

Component (iii): an organic polysiloxane resin including an $R^aR^bR^cSiO_{1/2}$ unit ($R^a$, $R^b$ and $R^c$ are each independently a $C_1$ to $C_6$ alkyl group or a $C_2$ to $C_{10}$ alkenyl group, at least one of $R^a$, $R^b$ and $R^c$ being a $C_2$ to $C_{10}$ alkenyl group) (M unit) and a $SiO_{4/2}$ unit (Q unit), and Component (iv): an organic polysiloxane resin including an $R^dR^eR^fSiO_{1/2}$ unit ($R^d$, $R^e$ and $R^f$ are each independently a $C_1$ to $C_6$ alkyl group) (M unit) and a $SiO_{4/2}$ unit (Q unit).

19. In 1 to 18, the organic polysiloxane resin may be present in an amount of 0.01 parts by weight to 20 parts by weight relative to 100 parts by weight of the alkenyl group-containing organic polysiloxane mixture.

20. In 1 to 19, the composition may further include an anchoring agent.

Another aspect of the present invention relates to an optical member including: an optical film and the silicone-based adhesive protective film according to the present invention formed on one surface of the optical member.

Advantageous Effects

The present invention provides a silicone-based adhesive protective film that provides good effects in protection of an adherend, a low peel strength increase rate, good wettability, and good step embedding properties.

The present invention provides a silicone-based adhesive protective film that can prevent contamination of and damage to an adherend when peeled off of the adherend.

BRIEF DESCRIPTION OF THE DRAWINGS

FIG. 1 is a plan view of a specimen for measurement of tensile strength of a silicone-based adhesive protective film in examples.

FIG. 2 is a cross-sectional view of a specimen for measurement of step embedment of a silicone-based adhesive protective film in examples.

BEST MODE

Hereinafter, embodiments of the present invention will be described in detail with reference to the accompanying drawings. However, it should be understood that the present invention is not limited to the following embodiments and may be embodied in different ways. The following embodiments are provided to provide a thorough understanding of the invention to those skilled in the art.

Herein, "$C_3$ to $C_{10}$ alkenyl group" is a $C_3$ to $C_{10}$ monoalkenyl group, for example, a propylene group, a butenyl group, a pentenyl group, a hexenyl group, a heptenyl group, an octenyl group, a nonenyl group, or a decenyl group.

Herein, in the "$C_3$ to $C_{10}$ alkenyl group", the alkenyl group may be bonded to silicon in an organic polysiloxane to be placed at a distal end thereof.

Herein, "hexenyl group" (Hex) may be a 1-hexenyl group, a 2-hexenyl group, a 3-hexenyl group, a 4-hexenyl group or a 5-hexenyl group. Preferably, the hexenyl group is a 5-hexenyl group (*—$(CH_2)_4$—$CH=CH_2$, * being a linking site to silicon).

Herein, "vinyl group" (Vi) means *—$CH=CH_2$(* being a linking site).

Herein, "Me" may be a methyl group and "Ph" may be a phenyl group.

Herein, "adherend" may include a glass plate or a plastic film, such as a polyimide film, an acryl film, a polyacrylamide film, and the like. Preferably, the adherend is a glass plate or a polyimide film.

Herein, "peeling strength" may be measured under conditions of a peeling speed of 2,400 mm/min, a peeling angle of 180°, and a peeling temperature of 25° C. using a tensile strength tester in accordance with JISZ2037.

As used herein to represent a specific numerical range, the expression "X to Y" means a value greater than or equal to X and less than or equal to Y (X≤ and ≤Y).

The inventors of the present invention developed a silicone-based adhesive protective film using a composition including an alkenyl group-containing organic polysiloxane mixture, a mixture of organic polysiloxane resins, a crosslinking agent, and a hydro-silylati on catalyst.

According to the present invention, the silicone-based adhesive protective film has good peel strength with respect to an adherend to provide good effects in protection of the adherend and allows less increase in peel strength over time in a state of being attached to the adherend, thereby providing good storage stability without deformation of and/or damage to the adherend upon removal of the silicone-based adhesive protective film from the adherend. In addition, the silicone-based adhesive protective film has good step embedding properties and/or wettability with respect to an adherend to prevent generation of bubbles when the silicone-based adhesive protective film is attached to the adherend, thereby providing good processability upon cutting a stack of the silicone-based adhesive protective film and the adherend. Further, the silicone-based adhesive protective film can prevent contamination of or damage to an adherend upon removal of the silicone-based adhesive protective film therefrom, thereby providing good processability.

Hereinafter, a silicone-based adhesive protective film according to one embodiment of the present invention will be described.

The silicone-based adhesive protective film is formed of a composition including an alkenyl group-containing organic polysiloxane mixture, an organic polysiloxane resin, a crosslinking agent, and a hydro-silylation catalyst, wherein the alkenyl group-containing organic polysiloxane mixture includes a mixture of a component (i) and a component (ii) and the organic polysiloxane resin includes at least one organic polysiloxane resin including an $R^aR^bR^cSiO_{1/2}$ unit ($R^a$, $R^b$ and $R^c$ will be described in detail below) and a $SiO_{4/2}$ unit:

Component (i): an organic polysiloxane having at least one silicon-bonded $C_3$ to $C_{10}$ alkenyl group, and Component (ii): an organic polysiloxane having at least one silicon-bonded vinyl group.

The component (i) and the component (ii) are distinguished according to the number of carbon atoms of the silicon-bonded alkenyl group.

With the alkenyl group-containing organic polysiloxane mixture including the component (i) alone without the component (ii), the silicone-based adhesive protective film has brittle properties and exhibits poor properties in terms of peel strength, wettability, cuttability and step embedding properties. With the alkenyl group-containing organic polysiloxane mixture including the component (ii) alone without the component (i), the silicone-based adhesive protective film exhibits an excessive peel strength increase rate, which causes deformation of and/or damage to an adherend upon removal of the silicone-based adhesive protective film therefrom, thereby causing deterioration in storage stability of the silicone-based adhesive protective film. With the composition including the alkenyl group-containing organic polysiloxane mixture alone without the organic polysiloxane resin, the silicone-based adhesive protective film has brittle properties, exhibit poor properties in terms of peel strength, wettability and cuttability, and allows an excessive peel strength increase rate, which causes deformation of and/or damage to an adherend upon removal of the silicone-based adhesive protective film therefrom, thereby causing deterioration in storage stability of the silicone-based adhesive protective film.

<Alkenyl Group-Containing Organic Polysiloxane Mixture>

The alkenyl group-containing organic polysiloxane mixture forms a matrix of the silicone-based adhesive protective film.

In one embodiment, the alkenyl group-containing organic polysiloxane mixture includes the component (i) and the component (ii) to form a silicone-based adhesive protective film having a peel strength of 3 gf/inch or less and a peel strength increase rate of 50% or less, as calculated by Equation 1, whereby the silicone-based adhesive protective film has good peel strength with respect to an adherend to provide good effects in protection of the adherend and can prevent damage to and/or deformation of the adherend by allowing easy removal of the silicone-based adhesive protective film from the adherend.

$$\text{Peel strength increase rate} = (P2-P1)/P1 \times 100, \quad \text{[Equation 1]}$$

where P1 denotes an initial peel strength (unit: gf/inch) of the silicone-based adhesive protective film with respect to an adherend in a specimen of the silicone-based adhesive protective film and the adherend; and P2 denotes a peel strength (unit: gf/inch) of the silicone-based adhesive protective film with respect to the adherend of the specimen, as measured after the specimen is left under conditions of 23° C. and 50% RH for 14 days.

Herein, "initial peel strength" refers to peel strength of the silicone-based adhesive protective film with respect to the adherend before the specimen is left under conditions of 23° C. and 50% RH for 14 days.

In one embodiment, the silicone-based adhesive protective film may have a peel strength of greater than 0 gf/inch to 3 gf/inch, for example, 1 gf/inch to 3 gf/inch, with respect to an adherend. The silicone-based adhesive protective film having a peel strength of 1 gf/inch to 3 gf/inch can provide further improvement in protection of the adherend.

In one embodiment, the silicone-based adhesive protective film may have a peel strength increase rate of 0% to 40%, as calculated by Equation 1. For example, the silicone-based adhesive protective film may have a peel strength increase rate of 0%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50%, as calculated by Equation 1.

In Equation 1, each of P1 and P2 may be 3 gf/inch or less, preferably greater than 0 gf/inch to 3 gf/inch, for example, 1 gf/inch to 3 gf/inch.

In one embodiment, the silicone-based adhesive protective film may have a peel strength increase rate of 100% or less, for example, 0% to 100%, for example, 5% to 100%, as calculated by Equation 1-1.

$$\text{Peel strength increase rate} = (P3-P1)/P1 \times 100, \quad \text{[Equation 1-1]}$$

where P1 denotes an initial peel strength (unit: gf/inch) of the silicone-based adhesive protective film with respect to an adherend in a specimen of the silicone-based adhesive protective film and the adherend; and P3 denotes a peel strength (unit: gf/inch) of the silicone-based adhesive protective film with respect to the adherend of the specimen, as measured after the specimen is left at 50° C. for 7 days.

For example, the silicone-based adhesive protective film may have a peel strength increase rate of 0%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100%, as calculated by Equation 1-1.

In Equation 1, each of P1 and P3 may be in the rage of greater than 0 gf/inch to 3 gf/inch, for example, 1 gf/inch to 3 gf/inch.

In one embodiment, the silicone-based adhesive protective film may have a residual peel strength variation rate of less than 20%, for example, 0% to 15%, as calculated by Equation 2. Within this range, the silicone-based adhesive protective film can prevent contamination of and damage to an adherend upon removal of the silicone-based adhesive protective film from the adherend after the silicone-based adhesive protective film is attached thereto.

Residual peel strength variation rate=$(1-(M2/M1))\times 100$, [Equation 2]

where M1 denotes a peel strength (unit: gf/inch) of an adhesive tape with respect to an adherend; and M2 denotes a peel strength (unit: gf/inch) of the adhesive tape with respect to the adherend upon removal of the adhesive film from the adherend of a specimen, as measured after the silicone-based adhesive protective film is removed from the specimen and the adhesive tape is attached to a surface of the specimen having the silicone-based adhesive protective film removed therefrom and is left under conditions of 23° C. and 50% RH for 24 hours, in which the specimen is prepared by attaching a stack of the silicone-based adhesive protective film and a release film to the adherend via the silicone-based adhesive protective film and is left at 50° C. for 14 days.

For example, the silicone-based adhesive protective film may have a residual peel strength variation rate of 0%, 1%, 2%, 3%, 4%, 5%, 6%, 7%, 8%, 9%, 10%, 11%, 12%, 13%, 14% or 15%, as calculated by Equation 2.

The adhesive tape may be a typical adhesive tape having adhesive properties. For example, the adhesive tape may be a Nitto 31B adhesive tape. In one embodiment, M1 may be in the range of 800 gf/inch to 1,000 gf/inch.

In one embodiment, the silicone-based adhesive protective film may have a residual peel strength reduction rate of −50% or more, preferably −45% to 0%, as calculated by Equation 2-1. Within this range, the silicone-based adhesive protective film can prevent contamination of and damage to an adherend upon removal of the silicone-based adhesive protective film from the adherend after the silicone-based adhesive protective film is attached thereto.

Residual peel strength reduction rate=$(M3-M4)/M4\times 100$, [Equation 2-1]

where M3 denotes a peel strength (unit: gf/inch) of an adhesive tape upon removal of the adhesive film from an adherend of a specimen, as measured after the silicone-based adhesive protective film is removed from the specimen and the adhesive tape is attached to a surface of the specimen having the silicone-based adhesive protective film removed therefrom and is left at 25° C. for 30 minutes, in which the specimen is prepared by attaching a stack of the silicone-based adhesive protective film and a release film to the adherend via the silicone-based adhesive protective film, left at 50° C. for 7 days, and cooled at 25° C. for 30 minutes; and M4 denotes a peel strength (unit: gf/25 mm) of the adhesive tape with respect to an initial adherend having no silicone-based adhesive protective film attached thereto.

In one embodiment, M4 may be in the range of 650 gf/inch to 1,100 gf/inch.

For example, the silicone-based adhesive protective film may have a residual peel strength reduction rate of −45%, −44%, −43%, −42%, −41%, −40%, −39%, −38%, −37%, −36%, −35%, −34%, −33%, −32%, −31%, −30%, −29%, −28%, −27%, −26%, −25%, −24%, −23%, −22%, −21%, −20%, −19%, −18%, −17%, −16%, −15%, −14%, −13%, −12%, −11%, −10%, −9%, −8%, −7%, −6%, −5%, −4%, −3%, −2%, −1% or 0%, as calculated by Equation 2-1.

The alkenyl group-containing organic polysiloxane mixture including the component (i) alone without the component (ii) can cause deterioration in wettability of the silicone-based adhesive protective film, thereby providing poor processability. The alkenyl group-containing organic polysiloxane mixture including the component (ii) alone without the component (i) can cause increase in peel strength increase rate and residual peel strength variation rate of the silicone-based adhesive protective film.

In the silicone-based adhesive protective film, the component (i) serves to secure peel strength, the peel strength increase rate, and the residual peel strength variation rate of the silicone-based adhesive protective film by preventing excessive increase in peel strength of the silicone-based adhesive protective film together with the component (ii).

In the component (i), the $C_3$ to $C_{10}$ alkenyl group is preferably a hexenyl group, more preferably a 5-hexenyl group. The 5-hexenyl group is bonded to silicon in the organic polysiloxane and has an alkenyl group at a distal end from silicon to secure a rapid curing speed, thereby increasing curing density while controlling peel strength variation over time.

The component (i) is a linear organic polysiloxane having at least one silicon-bonded $C_3$ to $C_{10}$ alkenyl group and may include at least one diorganosiloxane unit having a $C_3$ to $C_{10}$ alkenyl group.

For example, the component (i) may include an $R^1R^2SiO_{2/2}$ unit, where $R^1$ may be a $C_3$ to $C_{10}$ alkenyl group and $R^2$ may be a $C_1$ to $C_{10}$ alkyl group, for example, a methyl group, an ethyl group, or a propyl group.

The $R^1R^2SiO_{2/2}$ unit of the component (i) may be present in an amount of 0.01 mmol/g to 0.5 mmol/g, preferably 0.1 mmol/g to 0.3 mmol/g, in the organic polysiloxane. Within this range, the silicone-based adhesive protective film can have a suitable curing density.

In one embodiment, the component (i) may be an organic polysiloxane represented by Formula 1.

$(R^1R^2SiO_{2/2})x(R^3R^4SiO_{2/2})y$, [Formula 1]

in Formula 1,
$R^1$ is a $C_3$ to $C_{10}$ alkenyl group;
$R^2$ is a $C_1$ to $C_{10}$ alkyl group;
$R^3$ and $R^4$ are each independently a $C_1$ to $C_{10}$ alkyl group; and
$0<x\leq 1$, $0\leq y<1$, and $x+y=1$.

Preferably, in the organic polysiloxane mixture, the component (i) is a unary organic polysiloxane.

In one embodiment, the component (i) may include an organic polysiloxane including a $Hex(CH_3)SiO_{2/2}$ unit and a $(CH_3)2SiO_{2/2}$ unit.

In one embodiment, the component (i) may include an organic polysiloxane consisting of a $Hex(CH_3)SiO_{2/2}$ unit and a $(CH_3)_2SiO_{2/2}$ unit.

In one embodiment, the component (i) may be free from a vinyl group-bonded siloxane, for example, vinyl group-bonded dialkoxysilane, vinyl group-bonded trialkoxysilane, or vinyl group-bonded monoalkoxysilane.

In one embodiment, the component (i) may be free from a $SiO_{4/2}$ unit (Q unit).

In one embodiment, the component (i) may be an end-capped organic polysiloxane represented by Formula 1-1.

$$R^5R^6R^7SiO(R^1R^2SiO_{2/2})x(R^3R^4SiO_{2/2})ySiR^8R^9R^{10} \quad \text{[Formula 1-1]}$$

in Formula 1-1,
  $R^1$ is a $C_3$ to $C_{10}$ alkenyl group;
  $R^2$ is a $C_1$ to $C_{10}$ alkyl group;
  $R^3$ and $R^4$ are each independently a $C_1$ to $C_{10}$ alkyl group;
  $R^5$, $R^6$, $R^7$, $R^8$, $R^9$ and $R^{10}$ are each independently a $C_1$ to $C_{10}$ alkyl group; and
  $0<x\le1$, $0\le y<1$, and x+y=1.

In the organic polysiloxane of Formula 1 or Formula 1-1, the $R^1R^2SiO_{2/2}$ unit may be present in an amount of 0.01 mmol/g to 0.5 mmol/g, preferably 0.1 mmol/g to 0.3 mmol/g. Within this range, the silicone-based adhesive protective film can have a suitable curing density.

The organic polysiloxane of Formula 1 or Formula 1-1 or the component (i) may have a weight average molecular weight of 50,000 to 200,000, preferably 70,000 to 150,000. Within this range, the silicone-based adhesive protective film can have a suitable curing density and wettability.

Preferably, in Formula 1 or Formula 1-1, x, y and z satisfy relations: $0.001 \le x \le 0.4$, $0.6 \le y \le 0.999$, and x+y=1, more preferably $0.005 \le x \le 0.2$, $0.8 \le y \le 0.995$, and x+y=1. Within this range, the silicone-based adhesive protective film can have a low peel strength increase rate and can suppress contamination of an adherend upon removal of the silicone-based adhesive protective film from the adherend.

The organic polysiloxane of Formula 1 or Formula 1-1 may have a weight average molecular weight of 100,000 to 800,000, preferably 200,000 to 700,000. Within this range, the silicone-based adhesive protective film can have a low peel strength increase rate and can suppress contamination of an adherend upon removal of the silicone-based adhesive protective film from the adherend.

Preferably, in the organic polysiloxane mixture, the component (i) is a unary organic polysiloxane.

Preferably, the component (i) may include an organic polysiloxane including a $Hex(CH_3)SiO_{2/2}$ unit and a $(CH_3)_2SiO_{2/2}$ unit.

Preferably, the component (i) may include an organic polysiloxane consisting of a $Hex(CH_3)SiO_{2/2}$ unit and a $(CH_3)_2SiO_{2/2}$ unit.

The component (i) may be $(CH_3)_3SiO$-$(Hex(CH_3)SiO_{2/2})$x$((CH_3)_2SiO_{2/2})$y—$Si(CH_3)_3$ $(0<x\le1, 0\le y<1, x+y=1)$.

In one embodiment, the component (i) may be free from a $SiO_{4/2}$ unit (Q unit).

Relative to a total of 100 parts by weight of the alkenyl group-containing organic polysiloxane mixture or the mixture of the component (i) and the component (ii), the component (i) may be present in an amount of 10 parts by weight to 70 parts by weight, preferably 20 parts by weight to 60 parts by weight. Within this range, the silicone-based adhesive protective film can have good wettability and suppress peel strength variation over time.

The component (i) may be prepared through hydrolysis and condensation of alkoxysilane providing an $R^1R^2SiO_{2/2}$ unit and an $R^3R^4SiO_{2/2}$ unit by a method well known to those skilled in the art.

Relative to a total of 100 parts by weight of the alkenyl group-containing organic polysiloxane mixture or the mixture of the component (i) and the component (ii), the component (i) may be present in an amount of 10 parts by weight to 70 parts by weight, preferably 30 parts by weight to 70 parts by weight, more preferably 40 parts by weight to 60 parts by weight. Within this range, the silicone-based adhesive protective film can have good wettability and suppress peel strength variation over time while securing good step embedding properties. For example, the component (i) may be present in an amount of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69 or 70 parts by weight.

In the silicone-based adhesive protective film, the component (ii) can increase peel strength of the silicone-based adhesive protective film together with the component (i) so as to secure peel strength of the present invention while improving wettability.

The component (ii) is a linear organic polysiloxane having a silicon-bonded vinyl group and may include at least one diorganosiloxane unit having a vinyl group.

In one embodiment, the component (ii) may be an organic polysiloxane having at least one silicon-bonded vinyl group at a side chain or at both ends thereof.

For example, the component (ii) may include $R^5R^6R^7SiO$— at a distal end of the organic polysiloxane, where $R^5$, $R^6$, $R^7$ are each independently a vinyl group or a $C_1$ to $C_{10}$ alkyl group and at least one of $R^5$, $R^6$ and $R^7$ is a vinyl group.

The component (ii) is the linear organic polysiloxane and may include a diorganosiloxane unit.

In one embodiment, the component (ii) may be free from a SiO4/2 unit (Q unit).

In one embodiment, the component (ii) may include an organic polysiloxane having at least one silicon-bonded vinyl group at both ends thereof. For example, the component (ii) may be an organic polysiloxane represented by Formula 2.

$$R^5R^6R^7SiO(R^1R^2SiO_{2/2})x(R^3R^4SiO_{2/2})ySiR^8R^9R^{10}, \quad \text{[Formula 2]}$$

in Formula 2,
  $R^1$, $R^2$, $R^3$ and $R^4$ are each independently a $C_1$ to $C_{10}$ alkyl group;
  $R^5$, $R^6$ and $R^7$ are each independently a vinyl group or a $C_1$ to $C_{10}$ alkyl group,
  at least one of $R^5$, $R^6$ and $R^7$ being a vinyl group;
  $R^8$, $R^9$ and $R^{10}$ are each independently a vinyl group or a $C_1$ to $C_{10}$ alkyl group,
  at least one of $R^8$, $R^9$ and $R^{10}$ being a vinyl group; and
  $0 \le x \le 1$, $0 \le y \le 1$, and x+y=1.

The component (ii) or the organic polysiloxane represented by Formula 2 may have a vinyl group equivalent weight of 0.01 mmol/g to 0.5 mmol/g, preferably 0.1 mmol/g to 0.3 mmol/g. Within this range, the silicone-based adhesive protective film can have a suitable reaction speed and reactivity.

The component (ii) or the organic polysiloxane represented by Formula 2 may have a weight average molecular weight of 100,000 to 300,000, preferably 200,000 to 300, 000, preferably 20,000 to 300,000, more preferably 30,000 to 50,000. Within this range, the silicone-based adhesive protective film can have suitable reactivity.

Preferably, the organic polysiloxane represented by Formula 2 includes $Vi(CH_3)_2SiO-((CH_3)_2SiO_{2/2})n-Si(CH_3)_2Vi$ (n being an integer of greater than 0 to 5,000).

In another embodiment, the component (ii) may be an organic polysiloxane including at least silicon-bonded vinyl group at a side chain thereof. For example, the component (ii) may be an organic polysiloxane represented by Formula 3.

$$(R^1R^2SiO_{2/2})x(R^3R^4SiO_{2/2})y(R^5R^6SiO_{2/2})z, \quad \text{[Formula 3]}$$

in Formula 3,
$R^1, R^2, R^3, R^4, R^5, R^6$ are each independently a $C_1$ to $C_{10}$ alkyl group, a vinyl group, or a $C_6$ to $C_{10}$ aryl group, at least one of $R^1$ and $R^2$ being a vinyl group; and
$0 \le x \le 1$, $0 \le y \le 1$, $0 \le z < 1$, and $x+y+z=1$.

In one embodiment, at least one of $R^3$ and $R^4$, preferably both $R^3$ and $R^4$, may be a $C_6$ to $C_{10}$ aryl group.

In one embodiment, at least one of $R^5$ and $R^6$, preferably both $R^5$ and $R^6$, may be a $C_1$ to $C_{10}$ alkyl group.

Preferably, the organic polysiloxane represented by Formula 3 includes $(Vi(CH_3)SiO_{2/2})x-((CH_3)_2SiO_{2/2})y-(Ph_2SiO_{2/2})z$.

In one embodiment, the organic polysiloxane represented by Formula 3 may be an end-capped organic polysiloxane represented by Formula 3-1.

$$R^7R^8R^9SiO(R^1R^2SiO_{2/2})x(R^3R^4SiO_{2/2})y(R^5R^6SiO_{2/2})zSiR^{10}R^{11}R^{12}, \quad \text{[Formula 3-1]}$$

in Formula 3-1,
$R^1, R^2, R^3, R^4, R^5$ and $R^6$ are each independently a $C_1$ to $C_{10}$ alkyl group, a vinyl group, or a $C_6$ to $C_{10}$ aryl group, at least one of $R^1$ and $R^2$ being a vinyl group;
$R^7, R^8, R^9, R^{10}, R^{11}$ and $R^{12}$ are each independently a $C_1$ to $C_{10}$ alkyl group; and
$0 < x \le 1$, $0 \le y < 1$, $0 \le z < 1$, and and $x+y+z=1$.

The component (ii) or the organic polysiloxane represented by Formula 3 or Formula 3-1 may have a vinyl group equivalent weight of 0.01 mmol/g to 0.5 mmol/g, preferably 0.1 mmol/g to 0.3 mmol/g. Within this range, the silicone-based adhesive protective film can have a suitable reaction speed and reactivity.

Preferably, the organic polysiloxane represented by Formula 3-1 includes an organic polysiloxane including $(CH_3)_3SiO-(Vi(CH_3)SiO_{2/2})x-((CH_3)_2SiO_{2/2})y-(Ph_2SiO_{2/2})z-Si(CH_3)_3$.

The component (ii) or the organic polysiloxane represented by Formula 3 or Formula 3-1 may have a weight average molecular weight of 50,000 to 800,000, preferably 100,000 to 700,000, preferably 200,000 to 700,000, more preferably 100,000 to 150,000.

Within this range, the silicone-based adhesive protective film can have suitable reactivity and reduce the peel strength increase rate while suppressing contamination of an adherend.

Preferably, in the organic polysiloxane represented by Formula 3 or Formula 3-1, x, y and z satisfy relations: $0.005 \le x \le 0.1$, $0.001 \le y \le 0.2$, $0.7 \le z \le 0.994$, and $x+y+z=1$. Within this range, the silicone-based adhesive protective film can reduce the peel strength increase rate while suppressing contamination of an adherend.

In another embodiment, the component (ii) may be an organic polysiloxane having at least one silicon-bonded vinyl group at a side chain thereof. For example, the component (ii) may be an organic polysiloxane represented by Formula 4.

$$(R^1R^2SiO_{2/2})x(R^3R^4SiO_{2/2})y, \quad \text{[Formula 4]}$$

in Formula 4,
$R^1, R^2, R^3$ and $R^4$ are each independently a $C_1$ to $C_{10}$ alkyl group, a vinyl group or a $C_6$ to $C_{10}$ aryl group, at least one of $R^1$ and $R^2$ being a vinyl group; and
$0 < x \le 1$, $0 \le y < 1$, and $x+y=1$.

Preferably, the organic polysiloxane represented by Formula 4 includes an organic polysiloxane including $(Vi(CH_3)SiO_{2/2})x-((CH_3)_2SiO_{2/2})y$.

For example, the component (ii) may be an end-capped organic polysiloxane represented by Formula 4-1.

$$R^5R^6R^7SiO(R^1R^2SiO_{2/2})x(R^3R^4SiO_{2/2})ySiR^8R^9R^{10}, \quad \text{[Formul 4-1]}$$

in Formula 4-1,
$R^1, R^2, R^3$ and $R^4$ are each independently a $C_1$ to $C_{10}$ alkyl group, a vinyl group or a $C_6$ to $C_{10}$ aryl group, at least one of $R^1$ and $R^2$ being a vinyl group;
$R^5, R^6, R^7, R^8, R^9$ and $R^{10}$ are each independently a $C_1$ to $C_{10}$ alkyl group;
$0 < x \le 1$, $0 \le y < 1$, and $x+y=1$.

Preferably, in the organic polysiloxane represented by Formula 4 or Formula 4-1, x, y and z satisfy relations: $0.005 \le x \le 0.1$, $0.9 \le y \le 0.995$, and $x+y=1$. Within this range, the silicone-based adhesive protective film can reduce the peel strength increase rate while suppressing contamination of an adherend.

Preferably, the organic polysiloxane represented by Formula 4-1 includes an organic polysiloxane including $(CH_3)_3SiO-(Vi(CH_3)SiO_{2/2})x-((CH_3)_2SiO_{2/2})y-Si(CH_3)_3$.

The component (ii) or the organic polysiloxane represented by Formula 4 or Formula 4-1 may have a vinyl group equivalent weight of 0.01 mmol/g to 0.5 mmol/g, preferably 0.1 mmol/g to 0.3 mmol/g. Within this range, the silicone-based adhesive protective film can have a suitable reaction speed and reactivity.

The component (ii) or the organic polysiloxane represented by Formula 4 or Formula 4-1 may have a weight average molecular weight of 50,000 to 800,000, preferably 100,000 to 700,000, more preferably 150,000 to 700,000, still more preferably 200,000 to 700,000. Within this range, the silicone-based adhesive protective film can have a suitable curing density and wettability, and can reduce the peel strength increase rate while suppressing contamination of an adherend.

Preferably, in the organic polysiloxane mixture, the component (ii) is a unary organic polysiloxane.

Preferably, in the organic polysiloxane mixture, the component (ii) consists of the organic polysiloxane represented by Formula 2.

Preferably, in the organic polysiloxane mixture, the component (ii) consists of the organic polysiloxane represented by Formula 3.

Preferably, in the organic polysiloxane mixture, the component (ii) is a mixture of the organic polysiloxane represented by Formula 2 and the organic polysiloxane represented by Formula 4.

In one embodiment, the component (ii) may be free from a $SiO_{4/2}$ unit (Q unit).

Relative to a total of 100 parts by weight of the alkenyl group-containing organic polysiloxane mixture or the mixture of the component (i) and the component (ii), the component (ii) may be present in an amount of 30 parts by weight to 90 parts by weight, preferably 40 parts by weight to 80 parts by weight, more preferably 40 parts by weight to 60 parts by weight. Within this range, the silicone-based adhesive protective film can have suitable initial peel strength and good wettability, and can reduce the peel strength increase rate while suppressing contamination of an adherend.

For example, the component (ii) may be present in an amount of 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or 90 parts by weight.

<Organic Polysiloxane Resin>

In the silicone-based adhesive protective film, the organic polysiloxane resin serves to reduce the peel strength increase rate over time while improving reliability and the residual peel strength reduction rate. The organic polysiloxane resin also serves to improve step embedding properties of the silicone-based adhesive protective film.

The organic polysiloxane resin may include at least one of organic polysiloxane resins including an $R^a R^b R^c SiO_{1/2}$ unit ($R^b$ and $R^c$ are each independently a $C_1$ to $C_6$ alkyl group or a $C_2$ to $C_{10}$ alkenyl group) and a $SiO_{4/2}$ unit.

In one embodiment, the organic polysiloxane resin includes an MQ resin including an M unit and a Q unit. As well known to those skilled in the art, the M unit means a tri-substituted $SiO_{1/2}$ unit and the Q unit means a $SiO_{4/2}$ unit.

In one embodiment, the organic polysiloxane resin may include a mixture of a first MQ resin including an M unit having a $C_2$ to $C_{10}$ alkenyl group and a Q unit and a second MQ resin including an M unit free from a $C_2$ to $C_{10}$ alkenyl group and a Q unit. The presence of the first MQ resin and the second MQ resin further reduces the peel strength increase rate of the silicone-based adhesive protective film.

In one embodiment, the organic polysiloxane resin may include a mixture of a component (iii) as the first MQ and a component (iv) as the second MQ resin.

Component (iii): an organic polysiloxane resin including an $R^a R^b R^c SiO_{1/2}$ unit ($R^a$, $R^b$ and $R^c$ will be described in detail below) (M unit) and a $SiO_{4/2}$ unit (Q unit).

Component (iv): an organic polysiloxane resin including an $R^d R^e R^f SiO_{1/2}$ unit ($R^4$, $R^5$, and $R^6$ will be described in detail below) (M unit) and a $SiO_{4/2}$ unit (Q unit).

In the $R^a R^b R^c SiO_{1/2}$ unit of Component (iii), $R^a$, $R^b$ and $R^c$ are each independently a $C_1$ to $C_6$ alkyl group or a $C_2$ to $C_{10}$ alkenyl group, for example, a methyl group, an ethyl group, a propyl group, such as an isopropyl group and an N-propyl group, a vinyl group or an allyl group, and at least one of $R^a$, $R^b$ and $R^c$ may be a $C_2$ to $C_{10}$ alkenyl group.

In the $R^d R^e R^f SiO_{1/2}$ unit of Component (iv), $R^d$, $R^e$ and $R^f$ are each independently a $C_1$ to $C_6$ alkyl group, for example, a methyl group, an ethyl group, or a propyl group, such as an isopropyl group and an N-propyl group.

In one embodiment, in the $R^a R^b R^c SiO_{1/2}$ unit of Component (iii), at least one of $R^a$, $R^b$ and $R^c$ may be a vinyl group.

In one embodiment, in the $R^d R^e R^f SiO_{1/2}$ unit of Component (iv), at least two or three of $R^d$, $R^e$ and $R^f$ may be a methyl group.

For example, in the component (iii), the $R^a R^b R^c SiO_{1/2}$ unit and the $SiO_{4/2}$ unit may be present in a mole ratio ($R^a R^b R^c SiO_{1/2}$ unit: $SiO_{4/2}$ unit) of 0.5:1 to 1.5:1, preferably 0.8:1 to 1.2:1. Within this range, the silicone-based adhesive protective film can increase curing density while securing suitable modulus. Here, "mole ratio" may be calculated based on an area ratio between the $SiO_{1/2}$ unit and the $SiO_{4/2}$ unit obtained by measuring silicon NMR with respect to the silicone-based adhesive protective film, without being limited thereto.

In another example, in the component (iii), the $R^a R^b R^c SiO_{1/2}$ unit and the $SiO_{4/2}$ unit may be present in a mole ratio ($R^a R^b R^c SiO_{1/2}$ unit: $SiO_{4/2}$ unit) of 0.25:1 to 2.5:1, preferably 0.45:1 to 2:1. Within this range, the silicone-based adhesive protective film can reduce the peel strength increase rate while suppressing contamination of an adherend. Here, "mole ratio" may be calculated based on an area ratio between the $SiO_{1/2}$ unit and the $SiO_{4/2}$ unit obtained by measuring silicon NMR with respect to the silicone-based adhesive protective film, without being limited thereto.

In the component (iii), the $C_2$ to $C_{10}$ alkenyl group of $R^a$, $R^b$ and $R^c$, preferably a vinyl group, may be present in an amount of 0.1 mole % to 30 mole %, preferably 0.5 mole % to 20 mole %. Within this range, the silicone-based adhesive protective film can substantially suppress increase in peel strength over time.

In the component (iii), the $C_2$ to $C_{10}$ alkenyl group of $R^a$, $R^b$ and $R^c$, preferably a vinyl group, may be present in an amount of 0.1 mmol/g to 1.5 mmol/g, preferably 0.5 mmol/g to 1.0 mmol/g. Within this range, the silicone-based adhesive protective film can substantially suppress increase in peel strength over time.

In the component (iv), the $R^d R^e R^f SiO_{1/2}$ unit and the $SiO_{4/2}$ unit may be present in a mole ratio ($R^d R^e R^f SiO_{1/2}$ unit:$SiO_{4/2}$ unit) of 0.5:1 to 1.5:1, preferably 0.8:1 to 1.2:1. Within this range, the silicone-based adhesive protective film can have suitable initial peel strength.

The component (iii) may be present in an amount of 0.1 parts by weight to 10 parts by weight, preferably 0.5 parts by weight to 10 parts by weight, more preferably 1 part by weight to 5 parts by weight, relative to 100 parts by weight of the alkenyl group-containing organic polysiloxane mixture or the mixture of the component (i) and the component (ii). Within this range, the component (iii) can reduce an unreacted group in the alkenyl group-containing organic polysiloxane mixture, thereby improving the peel strength increase rate.

The component (iv) may be present in an amount of 0.01 parts by weight to 2 parts by weight, preferably 0.05 parts by weight to 2 parts by weight, more preferably 0.1 parts by weight to 1 part by weight, relative to 100 parts by weight of the alkenyl group-containing organic polysiloxane mixture or the mixture of the component (i) and the component (ii). Within this range, the silicone-based adhesive protective film can have suitable initial peel strength.

The organic polysiloxane resin may be present in an amount of 0.01 parts by weight to 20 parts by weight, preferably 0.5 parts by weight to 15 parts by weight, more preferably 0.5 parts by weight to 10 parts by weight, relative to 100 parts by weight of the alkenyl group-containing organic polysiloxane mixture or the mixture of the component (i) and the component (ii). Within this range, the silicone-based adhesive protective film can have suitable initial peel strength and can control peel strength variation over time.

The organic polysiloxane resin may be present in an amount of 0.01 parts by weight to 20 parts by weight, preferably 0.1 parts by weight to 15 parts by weight, more preferably 0.1 parts by weight to 10 parts by weight, still more preferably 0.1 parts by weight to 7 parts by weight, still more preferably 1 part by weight to 7 parts by weight, still more preferably 2 parts by weight to 7 parts by weight, relative to 100 parts by weight of the alkenyl group-containing organic polysiloxane mixture or the mixture of the component (i) and the component (ii). Within this range, the silicone-based adhesive protective film can reduce the peel strength increase rate while suppressing contamination of an adherend. For example, the organic polysiloxane resin may be present in an amount of 0.01, 0.05, 0.1, 0.5, 1, 2, 3, 4, 5, 6, 7, 8, 9, 10, 11, 12, 13, 14, 15, 16, 17, 18, 19 or 20 parts by weight.

<Crosslinking Agent>

The crosslinking agent may include a hydrogen organopolysiloxane having two or more silicon-bonded hydrogen (Si—H) groups. In one embodiment, the crosslinking agent may be represented by Formula 5:

$$R^4R^5R^6SiO(R^1R^2SiO_{2/2})x(HR^3SiO_{2/2})ySiR^7R^8R^9, \quad \text{[Formula 5]}$$

in Formula 5, $R^1$, $R^2$, $R^3$, $R^4$, $R^5$, $R^6$, $R^7$, $R^8$ and $R^9$ are each independently a $C_1$ to $C_{10}$ alkyl group, and $0 \leq x < 1$, $0 < y \leq 1$, and $x+y=1$.

The crosslinking agent may be present in an amount of 1 part by weight to 5 parts by weight, preferably 1 part by weight to 3 parts by weight, relative to 100 parts by weight of the alkenyl group-containing organic polysiloxane mixture or the mixture of the component (i) and the component (ii). Within this range, the crosslinking agent can reduce peel strength variation over time.

The crosslinking agent may be present in an amount of 0.1 parts by weight to 5 parts by weight, preferably 1 part by weight to 3 parts by weight, relative to 100 parts by weight of the alkenyl group-containing organic polysiloxane mixture or the mixture of the component (i) and the component (ii). Within this range, the crosslinking agent can reduce peel strength variation over time. For example, the crosslinking agent may be present in an amount of 0.1, 0.2, 0.3, 0.4, 0.5, 0.6, 0.7, 0.8, 0.9, 1, 2, 3, 4 or 5 parts by weight.

<Hydro-Silylation Catalyst>

The hydro-silylation catalyst accelerates reaction between the organic polysiloxane and the crosslinking agent. The hydro-silylation catalyst may include a platinum catalyst, a ruthenium catalyst, or an osmium catalyst. Specifically, the hydro-silylation catalyst may include a typical platinum catalyst known to those skilled in the art. For example, the hydro-silylation catalyst may include chloroplatinic acid, an alcohol solution of chloroplatinic acid, a complex of chloroplatinic acid and olefin, a complex of chloroplatinic acid and alkenyl siloxane, and the like.

The hydro-silylation catalyst may be present in an amount of 0.1 parts by weight to 3 parts by weight, preferably 0.5 parts by weight to 2 parts by weight, relative to 100 parts by weight of the alkenyl group-containing organic polysiloxane mixture or the mixture of the component (i) and the component (ii). Within this range, the crosslinking agent can suppress peel strength variation over time. For example, the hydro-silylation catalyst may be present in an amount of 0.1, 0.2, 0.3, 0.4, 0.5, 0.6, 0.7, 0.8, 0.9, 1, 2 or 3 parts by weight.

<Anchoring Agent>

The composition for the silicone-based adhesive protective film may further include an anchoring agent.

The anchoring agent serves to further improve peel strength of the silicone-based adhesive protective film. The anchoring agent may include a typical siloxane compound known to those skilled in the art. The anchoring agent may include at least one selected from the group of vinyltriethoxysilane, allyltrimethoxysilane, allyltriethoxysilane, 3-glycidoxypropyltrimethoxysilane, and 3-(meth)acryloxypropyltrimethoxysilane.

The anchoring agent may be present in an amount of less than 1 part by weight, specifically 0.05 parts by weight to less than 1 part by weight, preferably 0.1 parts by weight to 0.5 parts by weight, relative to 100 parts by weight of the alkenyl group-containing organic polysiloxane mixture or the mixture of the component (i) and the component (ii). Within this range, the anchoring agent can improve adhesion of the silicone-based adhesive protective film with respect to a base film.

The composition for the silicone-based adhesive protective film may further include an organic solvent to form a thin composition layer through improvement in coatability of the composition. The organic solvent may include toluene, xylene, hexane, heptane, and methyl ethyl ketone, without being limited thereto.

The composition for the silicone-based adhesive protective film may further include a hydrosilylation repressor. The hydrosilylation repressor serves to suppress reaction between the alkenyl group-containing organic polysiloxane mixture and the crosslinking agent and/or reaction between the mixture of the organic polysiloxane resin and the crosslinking agent to form a composition having target viscosity while improving storage stability. The hydrosilylation repressor may include a typical kind of hydrosilylation repressor known to those skilled in the art. For example, the hydrosilylation repressor may include 3-methyl-1-butine-1-ol and 3,5-dimethyl-1-butine-1-ol, without being limited thereto.

The silicone-based adhesive protective film may further include typical additives known to those skilled in the art.

The silicone-based adhesive protective film may have a tensile strength of 0.5 MPa to 10 MPa, preferably 0.7 MPa to 7 MPa, more preferably 1.5 MPa to 7 MPa. Within this range, the silicone-based adhesive protective film can have good wettability and step embedding properties.

The silicone-based adhesive protective film may have a haze of 5% or less, for example, 0% to 1%. Within this range, the silicone-based adhesive protective film can be applied to an optical display.

The silicone-based adhesive protective film may have a thickness of 100 μm or less, for example, 75 μm or less, greater than 0 μm to 75 μm. Within this thickness range, the silicone-based adhesive protective film can protect an adherend and can be easily removed therefrom when the silicone-based adhesive protective film is attached thereto.

The silicone-based adhesive protective film may be formed of the composition for the silicone-based adhesive protective film. Each of the components of the composition for the silicone-based adhesive protective film according to the present invention may be obtained through synthesis by a method well-known to those skilled in the art or may be obtained from commercially available products in the art.

An optical member according to one embodiment of the invention includes an optical film and an adhesive protective film formed on at least one surface of the optical film, wherein the adhesive protective film may include the silicone-based adhesive protective film according to embodiments of the present invention.

The optical film is a display panel and may include a polyimide film. In one embodiment, the optical film may include a light emitting element layer and a polyimide film formed on at least one surface of the light emitting element layer. An organic insulation layer or an inorganic insulation layer may be further formed between the optical film and the silicone-based adhesive protective film. The optical member may further include a release film (liner) on the other surface of the silicone-based adhesive protective film. The release film can prevent contamination of the adhesive protective film due to foreign matter and the like. As the release film, an optical film formed of the same material as or a different material from the aforementioned optical film may be used. For example, the release film may be formed of at least one resin selected from the group of a polyethylene terephthalate resin, a polycarbonate resin, a polyimide resin, a poly(meth) acrylate resin, a cyclic olefin polymer resin, and an acrylic resin. The release film may have a thickness of 10 μm to 100 μm, preferably 10 μm to 50 μm. Within this range, the release film can support the adhesive protective film.

Next, the present invention will be described in more detail with reference to some examples. However, it should be noted that these examples are provided for illustration only and are not to be construed in any way as limiting the present invention.

Example 1

Components listed in Table 1 were mixed in amounts (unit: parts by weight) as listed in Table 1 and 10 parts by weight of toluene was further added as a solvent to the mixture, thereby preparing a composition for silicone-based adhesive protective films.

The prepared composition was deposited to a predetermined thickness on a release film (polyethylene terephthalate (PET) film, thickness: 75 μm), dried in an oven at 80° C. for 2 minutes and at 130° C. for 3 minutes, and left at room temperature for 3 days, thereby preparing a stack of the silicone-based adhesive protective film (thickness: 25 μm) and the release film.

Examples 2 to 13

Each silicone-based adhesive protective film was prepared in the same manner as in Example 1 except that the kind and amount of each component of a composition for silicone-based adhesive protective films were changed as listed in Tables 1 and 2.

Compatative Examples 1 to 6

Each silicone-based adhesive protective film was prepared in the same manner as in Example 1 except that the kind and amount of each component of a composition for silicone-based adhesive protective films were changed as listed in Table 2 (unit: parts by weight).

Example 14

Components listed in Table 3 were mixed in amounts (unit: parts by weight) as listed in Table 3 and 10 parts by weight of toluene was further added as a solvent to the mixture, thereby preparing a composition for silicone-based adhesive protective films.

The prepared composition was deposited to a predetermined thickness on a release film (polyethylene terephthalate (PET) film, thickness: 75 μm), dried in an oven at 80° C. for 2 minutes and at 130° C. for 3 minutes, and left at room temperature for 3 days, thereby preparing a stack of the silicone-based adhesive protective film (thickness: 25 μm) and the release film.

Examples 15 to 20

Each silicone-based adhesive protective film was prepared in the same manner as in Example 1 except that the kind and amount of each component of a composition for silicone-based adhesive protective films in Example 14 were changed as listed in Table 3.

Comparative Examples 7 to 9

Each silicone-based adhesive protective film was prepared in the same manner as in Example 1 except that the kind and amount of each component of a composition for silicone-based adhesive protective films in Example 14 were changed as listed in Table 3.

Property Evaluation (1)

The compositions for silicone-based adhesive protective films and/or the silicone-based adhesive protective films prepared in Examples 1 to 13 and Comparative Examples 1 to 6 were evaluated as to the following properties and results are shown in Tables 1 to 3.

(1) Initial peel strength (A) (unit: gf/inch): The stack of the silicone-based adhesive protective film and the release film (PET film) prepared in each of Examples and Comparative Examples was cut to a size of 25 mm×200 mm and was bonded to a polyimide (PI) film (GF200, SKC Kolon PI) via the silicone-based adhesive protective film, followed by compression using a 2 kg roller, thereby preparing a specimen. Then, peel strength was measured upon removal of the silicone-based adhesive protective film from the polyimide film under conditions of a peeling rate of 2,400 mm/min, a peeling angle of 180° and a peeling temperature of 25° C. using a texture analyzer (TA). Three specimens were prepared and peel strength was measured with respect to each of the specimens, followed by calculating an average value. This value was defined as initial peel strength. Initial peel strength was evaluated by the same method using a glass plate instead of the polyimide film.

(2) Peel strength over time (A) (unit: gf/inch): A specimen was prepared in the same manner as in (1), left in an oven at 50° C. for 7 days and cooled outside the oven at room temperature for 30 minutes, followed by measuring peel strength in the same manner as in (1). Peel strength was measured by the same method using a glass plate instead of the polyimide film.

(3) Peel strength increase rate (A) (unit: %): Peel strength increase rate was calculated according to Equation 1-1 based on peel strength values obtained in (1) and (2).

(4) Residual peel strength (unit: gf/inch): The stack of the silicone-based adhesive protective film and the release film (PET film) prepared in each of Examples and Comparative Examples was cut to a size of 35 mm×120 mm and was bonded to a polyimide film (GF200, SKC Kolon PI) via the silicone-based adhesive protective film, followed by compression under a 2 kg roller, thereby preparing a specimen. The prepared specimen was left in an oven at 50° C. for 7 days and cooled outside the oven at room temperature for 30 minutes, followed by removing the silicone-based adhesive protective film from the polyimide film. Next, an adhesive tape (31B-75PLC, Nitto Denko Co., Ltd.) was attached to the surface of the polyimide film, from which the silicone-based adhesive protective film was removed, in the same area as the silicone-based adhesive protective film removed from the polyimide film. Then, the adhesive tape attached to the polyimide film was left at room temperature for 30 minutes, followed by measuring residual peel strength (M3) upon removal of the adhesive tape from the polyimide film at 25° C. under conditions of a peeling rate of 300 mm/min and a peeling angle of 180°. Here, peel strength was measured using a Texture analyzer (TA). Residual peel strength was measured by the same method using an alkali-free glass plate instead of the polyimide film.

(5) Residual peel strength reduction rate (unit: %): The adhesive tape (31B-75PLC, Nitto Denko Co., Ltd.) used in (4) was attached to the polyimide film [initial polyimide film having no silicone-based adhesive protective film attached thereto] in the same area and left at room temperature for 30 minutes, followed by measuring standard peel strength (M4) in the same manner as in measurement of M3. The standard peel strength (M4) was 970 gf/inch. Residual peel strength reduction rate was calculated by Equation 2-1:

Residual peel strength reduction rate=$(M3-M4)/M4\times 100$ [Equation 2-1]

The adhesive tape (31B-75PLC, Nitto Denko Co., Ltd.) used in (4) was attached to the glass plate [initial alkali-free glass plate having no silicone-based adhesive protective film attached thereto] in the same area and left at room temperature for 30 minutes, followed by measuring standard peel strength (M4) in the same manner as in measurement of M3. The standard peel strength (M4) was 652 gf/inch. Residual peel strength reduction rate was calculated by Equation 2-1.

(6) Tensile strength (unit: MPa): The composition prepared in each of Examples and Comparative Examples was coated to a predetermined thickness on one surface of a fluorinated film (FL-75BML, Dongwon Intech Co., Ltd.) and a PET film was bonded to the coating layer and cured at 130° C. for 5 minutes, thereby preparing a stack in which a 75 μm thick silicone-based adhesive protective film is interposed between the fluorinated film and the PET film. The stack was cut into a dog bone shape, as shown in FIG. 1, followed by removing the fluorinated film and the PET film, thereby preparing a specimen for measurement of tensile strength.

Referring to FIG. 1, the specimen has a dog bone shape having a total length of 40 mm, a total width of 15 mm, and a thickness of 75 μm. Tensile strength was measured with respect to the specimen for modulus measurement using a tensile strength tester (Instron Co., Ltd.). Specifically, the dog bone-shaped specimen shown in FIG. 1 was connected at a left end thereof to a first jig of the tester and at a right end thereof to a second jig thereof. Here, a connected portion of the left end to the first jig had the same area as a connected portion of the right end to the second jig. Then, tensile strength was measured by moving the second jig under conditions of a 1 kN load cell and a tensile speed of 50 mm/min at 25° C., with the first jig secured to the tester, until a portion of the dog bone-shaped specimen of FIG. 1 indicated by a width of 15 mm and a thickness of 5 mm was broken.

(7) Step embedment: Step embedment was evaluated on a specimen having a cross-section, as shown in FIG. 2. The stack of the silicone-based adhesive protective film and the release film prepared in each of Examples and Comparative Examples was cut to a size of 50 mm×50 mm and the release film was removed from the stack, thereby preparing a specimen for measurement of step embedment. Referring to FIG. 2, a prepared silicone-based adhesive protective film 2 was stacked on a patterned film [material: polyimide] 1. Here, in FIG. 2, a space 3 between the patterned film 1 and the silicone-based adhesive protective film 2 is an air gap. In FIG. 2, height H is 2 μm, length A is 1 mm, length B is 3 mm, and length C is 1 mm. Length A of the air gap (length of each of A and C to which the adhesive protective film was not attached in FIG. 2) was measured using an optical microscope. A length of the air gap less than or equal to 20 μm was rated as "○" and a length of the air gap greater than 20 μm was rated as "x".

Property Evaluation (2)

The compositions for silicone-based adhesive protective films and/or the silicone-based adhesive protective films prepared in Examples 14 to 20 and Comparative Examples 7 to 9 were evaluated as to the following properties and results are shown in Table 3.

(1) Initial peel strength (B) (unit: gf/inch): The stack of the silicone-based adhesive protective film and the release film (PET film) prepared in each of Examples and Comparative Examples was cut to a size of 25 mm×100 mm, bonded to a glass plate via the silicone-based adhesive protective film, compressed by a 2 kg roller, and left under conditions of 23° C. and 50% RH for 30 minutes, thereby preparing a specimen. Then, peel strength was measured upon removal of the silicone-based adhesive protective film from the glass plate at 25° C. under conditions of a peeling rate of 2,400 mm/min and a peeling angle of 180° using a texture analyzer (TA) in accordance with JISZ2037. Three specimens were prepared and peel strength was measured with respect to each of the specimens, followed by calculating an average value. This value was defined as initial peel strength.

(2) Peel strength over time (B) (unit: gf/inch): A specimen was prepared in the same manner as in (1) and left under conditions of 23° C. and 50% RH for 14 days, followed by measuring peel strength in the same manner as in (1).

(3) Peel strength increase rate (B) (unit: %): Peel strength increase rate was calculated according to Equation 1 based on peel strength values obtained in (1) and (2).

(4) Initial peel strength (A) (unit: gf/inch), peel strength over time (A) (unit: gf/inch) and peel strength increase rate (A) (unit: %): Initial peel strength (A) and peel strength over time (A) were measured as to the silicone-based adhesive protective film prepared in each of Examples 14 to 20 and Comparative Examples 7 to 9, followed by calculating the peel strength increase rate (A) according to Equation 1-1.

(5) Residue properties: An adhesive tape (Nitto 31B) having a size of 25 mm×100 mm was attached to a polyimide film (GF700, SKC Kolong PI), compressed by a 2 kg roll, and left under conditions of 23° C. and 50% RH for 24 hours, followed by measuring peel strength (M1) at 25° C. under conditions of a peeling rate of 2,400 mm/min and a peeling angle of 180° using a texture analyzer (TA) in accordance with JISZ0237.

The adhesive film prepared in each of Examples and Comparative Examples was cut into a specimen having size of 25 mm×100 mm. The specimen was left under conditions of 23° C. and 50% RH, attached to the polyimide film (GF700, SKC Kolon PI), compressed by a 2 kg roll, and left at 50° C. for 14 hours, followed by removal of the adhesive film from the specimen. The adhesive tape (Nitto 31B) used in measurement of M1 was attached to the surface of the specimen having the adhesive film removed therefrom and was left under conditions of 23° C. and 50% RH for 24 hours, followed by measuring peel strength (M2) at 25° C. under conditions of a peeling rate of 2,400 mm/min and a peeling angle of 180° using a texture analyzer (TA) in accordance with JISZ0237. A residual peel strength variation rate was calculated according to Equation 2.

$$\text{Residual peel strength variation rate} = (1-(M2/M1)) \times 100 \quad \text{[Equation 2]}$$

○: Residual peel strength variation rate of less than 20%, Excellent.

Δ: Residual peel strength variation rate of 20% to less than 50%, Usable.

x: Residual peel strength variation rate of 50% or more, Unusable.

(5) Wettability: The stack of the silicone-based adhesive protective film and the release film prepared in each of Examples and Comparative Examples was cut into a specimen having a size of 50 mm×100 mm. The specimen was left under conditions of 23° C. and 50% RH for 30 minutes and the release film was removed from the specimen to expose the adhesive film. Here, the specimen having the adhesive film attached to the PET film will be referred to as an adhesive tape. With both ends of the adhesive tape gripped by the hands, the center of the adhesive film was brought into contact with a glass plate and the hands were removed from the glass plate. Wettability was evaluated based on a time until the entirety of the adhesive tape was brought into close contact with the glass plate due to contact between the center of the adhesive tape and the glass plate. A shorter time for close contact with the glass plate indicates better affinity for the glass plate, which means that it is easier for the silicone-based adhesive protective film to protect the glass plate in displays and display manufacturing processes using the glass plate.

◯: 3 seconds or less until close contact (excellent wettability)

Δ: 3 seconds to less than 5 seconds until close contact (good wettability)

X: 5 seconds or more until close contact (unusable)

TABLE 1

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| 7654 |  | 40 | 40 | 40 | 40 | 40 | 20 | 20 | 20 | 20 | 20 |
| 7626 |  | 60 | 60 | 60 | 60 | 60 | 0 | 0 | 0 | 0 | 0 |
| 7664 |  | 0 | 0 | 0 | 0 | 0 | 0 | 0 | 0 | 0 | 0 |
| X-40-3306K |  | 0 | 0 | 0 | 0 | 0 | 80 | 80 | 80 | 80 | 80 |
| 7210 |  | 0.648 | 1.487 | 2.35 | 3.56 | 6.05 | 0.26 | 0.465 | 0.94 | 1.425 | 2.43 |
| 7028 |  | 1.5 | 1.5 | 1.5 | 1.5 | 1.5 | 0 | 0 | 0 | 0 | 0 |
| 4000 |  | 1.09 | 1.09 | 1.09 | 1.09 | 1.09 | 0 | 0 | 0 | 0 | 0 |
| CAT-PL-50T |  | 0 | 0 | 0 | 0 | 0 | 0.44 | 0.44 | 0.44 | 0.44 | 0.44 |
| NC-25 |  | 0 | 0 | 0 | 0 | 0 | 0 | 0 | 0 | 0 | 0 |
| 9250 |  | 0.2 | 0.2 | 0.2 | 0.2 | 0.2 | 0 | 0 | 0 | 0 | 0 |
| @PI film | Initial peel strength (A) | 1.32 | 1.36 | 1.47 | 1.49 | 1.60 | 1.45 | 1.66 | 1.76 | 1.89 | 1.96 |
|  | Peel strength over time (A) | 2.56 | 2.35 | 2.28 | 2.01 | 1.89 | 2.41 | 2.38 | 2.38 | 2.25 | 2.18 |
|  | Peel strength increase rate (A) | 94 | 73 | 55 | 35 | 18 | 66 | 43 | 35 | 19 | 11 |
| @glass plate | Initial peel strength (A) | 1.21 | 1.32 | 1.44 | 1.38 | 1.38 | 1.12 | 1.18 | 1.12 | 1.22 | 1.35 |
|  | Peel strength over time (A) | 2.40 | 2.20 | 1.97 | 1.89 | 1.65 | 1.85 | 1.80 | 1.63 | 1.56 | 1.51 |
|  | Peel strength increase rate (A) | 98 | 67 | 37 | 37 | 20 | 65 | 53 | 46 | 28 | 12 |
| @PI film | Residual peel strength | 769 | 858 | 780 | 747 | 786 | 783 | 798 | 802 | 822 | 862 |
|  | Residual peel strength reduction rate | −21 | −12 | −20 | −23 | −19 | −19 | −18 | −17 | −15 | −11 |
| @glass plate | Residual peel strength | 385 | 410 | 421 | 485 | 534 | 419 | 423 | 454 | 522 | 433 |
|  | Residual peel strength reduction rate | −41 | −37 | −35 | −26 | −18 | −36 | −35 | −30 | −20 | −34 |
| Tensile strength |  | 1.9 | 2.2 | 3.5 | 4.1 | 5.2 | 5.4 | 5.6 | 6.3 | 6.6 | 6.9 |
| Step embedment |  | ◯ | ◯ | ◯ | ◯ | ◯ | ◯ | ◯ | ◯ | ◯ | ◯ |

TABLE 2

|  | Example | | | Comparative Example | | | | | |
|---|---|---|---|---|---|---|---|---|---|
|  | 11 | 12 | 13 | 1 | 2 | 3 | 4 | 5 | 6 |
| 7654 | 29 | 29 | 29 | 40 | 20 | 20 | 100 | 0 | 40 |
| 7626 | 30 | 30 | 30 | 60 | 0 | 0 | 0 | 100 | 0 |
| 7664 | 41 | 41 | 41 | 0 | 0 | 80 | 0 | 0 | 0 |
| X-40-3306K | 0 | 0 | 0 | 0 | 80 | 0 | 0 | 0 | 0 |
| 7210 | 2 | 4 | 6 | 0 | 0 | 0 | 0.648 | 0.648 | 0.648 |
| 7028 | 1.0 | 1.0 | 1.0 | 1.50 | 0 | 0.25 | 1.5 | 1.5 | 1.50 |
| 4000 | 0 | 0 | 0 | 1.09 | 0 | 0 | 1.09 | 1.09 | 1.09 |
| CAT-PL-50T | 0 | 0 | 0 | 0 | 0.44 | 0.44 | 0 | 0 | 0 |
| NC-25 | 0.56 | 0.56 | 0.56 | 0 | 0 | 0 | 0 | 0 | 0 |
| 9250 | 0 | 0 | 0 | 0.2 | 0 | 0 | 0.2 | 0.2 | 0.2 |
| RJ-201 Silicone Oil (12,500 cst) | 0 | 0 | 0 | 0 | 0 | 0 | 0 | 0 | 60 |
| @PI film Initial peel strength (A) | 1.23 | 1.39 | 1.49 | 1.19 | 1.17 | 1.34 | 1.45 | 1.11 | 5.32 |
| Peel strength over time (A) | 1.39 | 1.49 | 1.59 | 2.76 | 2.45 | 1.41 | 1.52 | 3.2 | 13.53 |
| Peel strength increase rate (A) | 13 | 7 | 7 | 132 | 109 | 5 | 5 | 188 | 154 |
| @glass plate Initial peel strength (A) | 1.34 | 1.26 | 1.54 | 1.15 | 0.92 | 1.20 | 1.21 | 0.95 | 4.67 |
| Peel strength over time (A) | 2.27 | 1.77 | 1.82 | 2.85 | 1.95 | 1.77 | 1.31 | 3.1 | 15.2 |
| Peel strength increase rate (A) | 70 | 40 | 18 | 148 | 112 | 48 | 8 | 226 | 225 |

TABLE 2-continued

|  |  | Example | | | Comparative Example | | | | | |
|---|---|---|---|---|---|---|---|---|---|---|
|  |  | 11 | 12 | 13 | 1 | 2 | 3 | 4 | 5 | 6 |
| @PI film | Residual peel strength | 599 | 677 | 691 | 675 | 711 | 916 | 851 | 821 | 315 |
|  | Residual peel strength reduction rate | −38 | −30 | −29 | −30 | −27 | −6 | −12 | −15 | −68 |
| @glass plate | Residual peel strength | 493 | 525 | 541 | 341 | 399 | 531 | 521 | 528 | 153 |
|  | Residual peel strength reduction rate | −24 | −19 | −17 | −48 | −39 | −19 | −20 | −20 | −77 |
| Tensile strength |  | 4.1 | 4.4 | 5.3 | 1.7 | 5.2 | 6.1 | 10.3 | 0.39 | 0.86 |
| Step embedment |  | ○ | ○ | ○ | ○ | X | X | X | X | ○ |

TABLE 3

|  |  | Example | | | | | | | Comparative Example | | |
|---|---|---|---|---|---|---|---|---|---|---|---|
|  |  | 14 | 15 | 16 | 17 | 18 | 19 | 20 | 7 | 8 | 9 |
| 7654 |  | 40 | 40 | 40 | 40 | 40 | 40 | 60 | 40 | 100 | 0 |
| 7646 |  | 60 | 60 | 60 | 60 | 60 | 60 | 40 | 60 | 0 | 100 |
| 7028 |  | 1.1 | 1.1 | 1.1 | 1.1 | 1.1 | 1.1 | 1.1 | 1.1 | 1.1 | 1.1 |
| 7210 |  | 1 | 3 | 5 | 1 | 3 | 5 | 5 | 0 | 1 | 1 |
| 7426 |  | 0.1 | 0.1 | 0.1 | 0.5 | 0.5 | 0.5 | 0.5 | 0 | 0.1 | 0.1 |
| 4000 |  | 1 | 1 | 1 | 1 | 1 | 1 | 1 | 1 | 1 | 1 |
| @glass plate | Initial peel strength (A) | 1.7 | 1.68 | 1.64 | 1.95 | 1.84 | 1.66 | 1.54 | 1.67 | 0.9 | 2.5 |
|  | Peel strength over time (A) | 3.16 | 3.04 | 2.79 | 3.34 | 3.11 | 2.85 | 2.54 | 6.05 | 1.61 | 6.84 |
|  | Peel strength increase rate (A) | 86 | 81 | 70 | 71 | 69 | 72 | 65 | 262 | 79 | 174 |
| @PI film | Initial peel strength (A) | 2.43 | 2.21 | 2.15 | 2.39 | 2.27 | 2.1 | 2.19 | 2.52 | 1.34 | 3.64 |
|  | Peel strength over time (A) | 4.34 | 3.83 | 3.64 | 4.09 | 3.80 | 3.47 | 3.53 | 6.40 | 2.18 | 8.41 |
|  | Peel strength increase rate (A) | 79 | 73 | 70 | 71 | 68 | 65 | 61 | 154 | 63 | 131 |
| @glass plate | Initial peel strength (B) | 1.7 | 1.68 | 1.64 | 1.95 | 1.84 | 1.66 | 1.54 | 1.67 | 0.9 | 2.5 |
|  | Peel strength over time (B) | 2.24 | 2.15 | 2.09 | 2.54 | 2.38 | 2.28 | 2.08 | 3.24 | 1.1 | 4.5 |
|  | Peel strength increase rate (B) | 32 | 28 | 27 | 30 | 29 | 37 | 35 | 94 | 22 | 80 |
| Residue properties |  | ○ | ○ | ○ | ○ | ○ | ○ | ○ | ○ | ○ | X |
| Wettability |  | ○ | ○ | ○ | ○ | ○ | ○ | ○ | ○ | X | ○ |

*Components listed in Tables 1 to 3 are shown in Table 4.

TABLE 4

| Product Name | Classification (Manufacturer) | Description |
|---|---|---|
| 7654 | Organic polysiloxane 1 (Dow Corning) | Polydimethylsiloxane having a Si-bonded 5-hexenyl group at a side chain, trimethylsilly group, trimethylsillyoxy group-end capped |
| 7626 | Organic polysiloxane 2 (Dow Corning) | Polydimethylsiloxane having vinyl groups only at both ends |
| 7646 | Organic polysiloxane ii (Dow Corning) | Polydimethylsiloxane having vinyl groups only at both ends |
| XX-03 | Organic polysiloxane 3 (Shin-Etsu) | Polydimethylsiloxane having a Si-bonded vinyl group alone at a side chain, trimethylsilly group, trimethylsillyoxy group-end capped |
| XX-40-3306K | Organic polysiloxane 4 (Shin-Etsu) | Polydimethylsiloxane having a Si-bonded vinyl group alone as a vinyl group at a side chain and a Si-bonded phenyl group at a side chain (trimethylsilly group, trimethylsillyoxy group-end capped), some crosslinking agent. |
| 7210 | Organic polysiloxane resin (Dow Corning) | MQ resin having a (vinyl)$(CH_3)_2SiO_{1/2}$ unit alone as an M unit and a $SiO_{4/2}$ unit |
| 7426 | Organic polysiloxane resin (Dow Corning) | MQ resin having a $(CH_3)_2SiO_{1/2}$ unit alone as an M unit and a $SiO_{4/2}$ unit |
| 7028 | Crosslinking agent (Dow Corning) | Polydimethylsiloxane having a Si—H group |
| 4000 | Hydro-silylation catalyst 1 (Dow Corning) | Platinum catalyst |
| CAT-PL-50T | Hydro-silylation catalyst 2 (Dow Corning) | Platinum catalyst |
| NC-25 | Hydro-silylation catalyst 3 (Dow Corning) | Platinum catalyst |
| 9250 | Anchoring agent (Dow Corning) | — |
| RJ-201 Silicone Oil 12,500 cst | Organic polysiloxane5 (Ruisil) | Vinyl group-free polydimethylsiloxane, trimethylsilly group, trimethylsillyoxy group-end capped |

As shown in Tables 1 and 2, the silicone-based adhesive protective films according to the present invention had good effects in protection of an adherend, low peel strength increase rates, good wettability, and good step embedment. The silicone-based adhesive protective films according to the present invention did not cause contamination of and damage to an adherend upon removal of the silicone-based adhesive protective film from the adherend. Conversely, as shown in Table 2, the adhesive protective films of Comparative Examples 1 to 3 prepared without the organic polysiloxane resin according to the present invention failed to satisfy the peel strength increase rate according to the present invention or exhibited poor step embedment. In addition, each of the adhesive protective films of Comparative Examples 4 and 5 including the component (i) alone or the component (ii) alone exhibited poor step embedding properties or failed to satisfy the peel strength increase rate according to the present invention. In addition, the adhesive protective film of Comparative Example 6 prepared using a vinyl group-free polydimethylsiloxane instead of the component (ii) failed to satisfy the peel strength increase rate according to the present invention or to improve the residual peel strength reduction rate.

In addition, as shown in Table 3, the silicone-based adhesive protective film according to the present invention had good effects in protection of an adherend, a low peel strength increase rate, good wettability, good step embedment, and a low residue peeling reduction rate, thereby preventing contamination of and damage to an adherend upon removal of the silicone-based adhesive protective film from the adherend.

Conversely, the adhesive protective film of Comparative Example 7 prepared without the organic polysiloxane resin had a high peel strength increase rate. The adhesive protective film of Comparative Example 8 prepared without the component (ii) exhibited poor wettability and could not be used as a silicone-based adhesive protective film. The adhesive protective film of Comparative Example 9 prepared without using the component (i) had a high peel strength increase rate and a high residue peeling reduction rate, thereby causing contamination of and damage to an adherend upon removal of the silicone-based adhesive protective film from the adherend.

It should be understood that various modifications, changes, alterations, and equivalent embodiments can be made by those skilled in the art without departing from the spirit and scope of the present invention.

The invention claimed is:

1. A silicone-based adhesive protective film formed of a composition comprising an alkenyl group-containing organic polysiloxane mixture, an organic polysiloxane resin, a crosslinking agent, and a hydro-silylation catalyst, wherein the alkenyl group-containing organic polysiloxane mixture comprises a mixture of a component (i) and a component (ii), component (i) being an organic polysiloxane having at least one silicon-bonded $C_3$ to $C_{10}$ alkenyl group, component (ii) being an organic polysiloxane having at least one silicon-bonded vinyl group;

the organic polysiloxane resin comprises at least one organic polysiloxane resin comprising an $R^aR^bR^c\text{-}SiO_{1/2}$ unit and a $SiO_{4/2}$ unit; and $R^a$, $R^b$ and $R^c$ are each independently a $C_1$ to $C_6$ alkyl group or a $C_2$ to $C_{10}$ alkenyl group, and wherein the component (i) is present in an amount of 10 parts by weight to 45 parts by weight and the component (ii) is present in an amount of 55 parts by weight to 90 parts by weight relative to 100 parts by weight of the alkenyl group-containing organic polysiloxane mixture.

2. The silicone-based adhesive protective film according to claim 1, wherein the silicone-based adhesive protective film has a peel strength increase rate of 50% or less, as calculated by Equation 1:

Peel strength increase rate=$(P2-P1)/P1\times100$, [Equation 1]

where P1 denotes an initial peel strength (unit: gf/inch) of the silicone-based adhesive protective film with respect to an adherend in a specimen of the silicone-based adhesive protective film and the adherend; and P2 denotes a peel strength (unit: gf/inch) of the silicone-based adhesive protective film with respect to the adherend of the specimen, as measured after the specimen is left under conditions of 23° C. and 50% RH for 14 days.

3. The silicone-based adhesive protective film according to claim 1, wherein the silicone-based adhesive protective film has a peel strength increase rate of 100% or less, as calculated by Equation 1-1:

Peel strength increase rate=$(P3-P1)/P1\times100$, [Equation 1-1]

where P1 denotes an initial peel strength (unit: gf/inch) of the silicone-based adhesive protective film with respect to an adherend in a specimen of the silicone-based adhesive protective film and the adherend; and P3 denotes a peel strength (unit: gf/inch) of the silicone-based adhesive protective film with respect to the adherend of the specimen, as measured after the specimen is left at 50° C. for 7 days.

4. The silicone-based adhesive protective film according to claim 1, wherein the silicone-based adhesive protective film has a residual peel strength variation rate of less than 20%, as calculated by Equation 2:

residual peel strength variation rate=$(1-(M2/M1))\times100$, [Equation 2]

where M1 denotes a peel strength (unit: gf/inch) of an adhesive tape with respect to an adherend; and M2 denotes a peel strength (unit: gf/inch) of the adhesive tape with respect to the adherend upon removal of the adhesive tape from the adherend of a specimen, as measured after the silicone-based adhesive protective film is removed from the specimen and the adhesive tape is attached to a surface of the specimen having the silicone-based adhesive protective film removed therefrom and is left under conditions of 23° C. and 50% relative humidity (RH) for 24 hours, in which the specimen is prepared by attaching a stack of the silicone-based adhesive protective film and a release film to the adherend via the silicone-based adhesive protective film and is left at 50° C. for 14 days.

5. The silicone-based adhesive protective film according to claim 1, wherein the silicone-based adhesive protective film has a residual peel strength reduction rate of −50% or more, as calculated by Equation 2-1:

residual peel strength reduction rate=$(M3-M4)/M4\times100$, [Equation 2-1]

where M3 denotes a peel strength (unit: gf/inch) of an adhesive tape upon removal of the adhesive tape from an adherend of a specimen, as measured after the silicone-based adhesive protective film is removed from the specimen and the adhesive tape is attached to a surface of the specimen having the silicone-based adhesive protective film removed therefrom and is left at 25° C. for 30 minutes, in which the specimen is prepared by attaching a stack of the silicone-based adhesive protective film and a release film to the adherend via the silicone-based adhesive protective film, left at 50° C. for 7 days, and cooled at 25° C. for 30 minutes; and M4 denotes a peel strength (unit: gf/25 mm) of the adhesive tape with respect to an initial adherend having no silicone-based adhesive protective film attached thereto.

6. The silicone-based adhesive protective film according to claim 1, wherein the silicone-based adhesive protective film has a peel strength of 3 gf/inch or less with respect to an adherend.

7. The silicone-based adhesive protective film according to claim 1, wherein the $C_3$ to $C_{10}$ alkenyl group is a hexenyl group.

8. The silicone-based adhesive protective film according to claim 7, wherein the hexenyl group is a 5-hexenyl group.

9. The silicone-based adhesive protective film according to claim 1, wherein the organic polysiloxane of the component (i) is represented by Formula 1:

$(R^1R^2SiO_{2/2})x(R^3R^4SiO_{2/2})y$, [Formula 1]

in Formula 1,
$R^1$ is a $C_3$ to $C_{10}$ alkenyl group; $R^2$ is a $C_1$ to $C_{10}$ alkyl group; $R^3$ and $R^4$ are each independently a $C_1$ to $C_{10}$ alkyl group; and $0<x\leq$, $0\leq y<1$, and $x+y=1$.

10. The silicone-based adhesive protective film according to claim 9, wherein, in Formula 1, x and y satisfy $0.001 \leq x \leq 0.4$ and $0.6 \leq y \leq 0.999$.

11. The silicone-based adhesive protective film according to claim 1, wherein the organic polysiloxane of the component (ii) is at least one of organic polysiloxanes represented by Formula 2, Formula 3 or Formula 4:

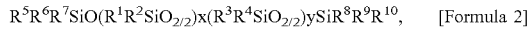
$R^5R^6R^7SiO(R^1R^2SiO_{2/2})x(R^3R^4SiO_{2/2})ySiR^8R^9R^{10}$, [Formula 2]

in Formula 2,
$R^1$, $R^2$, $R^3$ and $R^4$ are each independently a $C_1$ to $C_{10}$ alkyl group;

$R^5$, $R^6$ and $R^7$ are each independently a vinyl group or a $C_1$ to $C_{10}$ alkyl group, at least one of $R^5$, $R^6$ or $R^7$ being a vinyl group;

$R^8$, $R^9$ and $R^{10}$ are each independently a vinyl group or a $C_1$ to $C_{10}$ alkyl group, at least one of $R^8$, $R^9$ or $R^{10}$ being a vinyl group; and
$0 \leq x \leq 1$, $0 \leq y \leq 1$, and $x+y=1$;

$(R^1R^2SiO_{2/2})x(R^3R^4SiO_{2/2})y(R^5R^6SiO_{2/2})z$, [Formula 3]

in Formula 3,
$R^1$, $R^2$, $R^3$, $R^4$, $R^5$, $R^6$ are each independently a $C_1$ to $C_{10}$ alkyl group, a vinyl group, or a $C_6$ to $C_{10}$ aryl group, at least one of $R^1$ and $R^2$ being a vinyl group; and
$0 \leq x \leq 1$, $0 \leq y \leq 1$, $0 \leq z < 1$, and $x+y+z=1$;

$(R^1R^2SiO_{2/2})x(R^3R^4SiO_{2/2})y$, [Formula 4]

in Formula 4,
$R^1$, $R^2$, $R^3$ and $R^4$ are each independently a $C_1$ to $C_{10}$ alkyl group, a vinyl group or a $C_6$ to $C_{10}$ aryl group, at least one of $R^1$ and $R^2$ being a vinyl group; and
$0 < x \leq 1$, $0 \leq y < 1$, and $x+y=1$.

12. The silicone-based adhesive protective film according to claim 11, wherein the organic polysiloxane of Formula 2 is $Vi(CH_3)_2SiO-((CH_3)_2SiO_{2/2})n-Si(CH_3)_2Vi$, Vi being a vinyl group, and n being an integer of greater than 0 to 5,000.

13. The silicone-based adhesive protective film according to claim 11, wherein, in Formula 3, both $R^3$ and $R^4$ are a $C_6$ to $C_{10}$ aryl group; both $R^5$ and $R^6$ are a $C_1$ to $C_{10}$ alkyl group; and x, y and z satisfy relations: $0<x<1$, $0<y<1$, $0<z<1$, and $x+y+z=1$.

14. The silicone-based adhesive protective film according to claim 11, wherein, in Formula 4, both $R^3$ and $R^4$ are a $C_1$ to $C_{10}$ alkyl group; and x, y and z satisfy relations: $0<x<1$, $0<y<1$, and $x+y=1$.

15. The silicone-based adhesive protective film according to claim 1, wherein the component (i) is present in an amount of 10 parts by weight to 40 parts by weight and the component (ii) is present in an amount of 60 parts by weight to 90 parts by weight relative to 100 parts by weight of the alkenyl group-containing organic polysiloxane mixture.

16. The silicone-based adhesive protective film according to claim 1, wherein at least one of $R^a$, $R^b$ or $R^c$ of the organic polysiloxane resin is a $C_2$ to $C_{10}$ alkenyl group.

17. The silicone-based adhesive protective film according to claim 1, wherein the $R^aR^bR^cSiO_{1/2}$ unit and the $SiO_{4/2}$ unit are present in a mole ratio ($R^aR^bR^cSiO_{1/2}$ unit:$SiO_{4/2}$ unit) of 0.25:1 to 2.5:1 in the organic polysiloxane resin.

18. The silicone-based adhesive protective film according to claim 1, wherein the organic polysiloxane resin comprises a mixture of a component (iii) and a component (iv):
component (iii) being the organic polysiloxane resin comprising the $R^aR^bR^cSiO_{1/2}$ unit as an M unit and the $SiO_{4/2}$ unit as a Q unit, in component (iii), at least one of $R^a$, $R^b$ or $R^c$ being a $C_2$ to $C_{10}$ alkenyl group, and
component (iv) being an organic polysiloxane resin comprising an $R^dR^eR^fSiO_{1/2}$ unit as an M unit and a $SiO_{4/2}$ unit as a Q unit, wherein $R^d$, $R^e$ and $R^f$ are each independently a $C_1$ to $C_6$ alkyl group.

19. The silicone-based adhesive protective film according to claim 1, wherein the organic polysiloxane resin is present in an amount of 0.01 parts by weight to 20 parts by weight relative to 100 parts by weight of the alkenyl group-containing organic polysiloxane mixture.

20. The silicone-based adhesive protective film according to claim 1, wherein the composition further comprises an anchoring agent.

21. An optical member comprising: an optical film; and the silicone-based adhesive protective film according to claim 1 formed on one surface of the optical film.

* * * * *